United States Patent [19]

Carter et al.

[11] Patent Number: 5,161,230
[45] Date of Patent: Nov. 3, 1992

[54] MULTIFIELD IDENTIFICATION CIRCUIT AND RELATED METHOD OF OPERATION

[75] Inventors: Jeffery A. Carter, Manhattan Beach; Peggy M. Otsubo, Redondo Beach; Kenneth N. Gravenstede, Lawndale; Robert A. Grotz, Palos Verdes Estates, all of Calif.

[73] Assignee: TRW Inc., Redondo Beach, Calif.

[21] Appl. No.: 58,475

[22] Filed: Jun. 5, 1987

[51] Int. Cl.⁵ .............................................. G06F 15/00
[52] U.S. Cl. ................................. 395/800; 264/DIG. 1
[58] Field of Search ... 364/200 MS File, 900 MS File

[56] References Cited

U.S. PATENT DOCUMENTS

| | | | |
|---|---|---|---|
| 4,433,392 | 2/1984 | Beaven | 364/900 |
| 4,450,520 | 5/1984 | Hollaar et al. | 364/200 |
| 4,527,253 | 7/1985 | Sato et al. | 364/900 |
| 4,625,295 | 11/1986 | Skinner | 364/900 |
| 4,698,751 | 10/1987 | Parvin | 364/200 |
| 4,747,072 | 5/1988 | Robinson et al. | 364/200 |
| 4,760,523 | 7/1988 | Yu et al. | 364/200 |
| 4,811,217 | 3/1989 | Takizane et al. | 364/900 |

OTHER PUBLICATIONS

"The Design of Special Purpose VLSI Chips", Foster et al., Computer, pp. 26-30 and 32-40 (Jan. 1980).

Primary Examiner—Stuart N. Hecker
Assistant Examiner—Rebecca L. Rudolph
Attorney, Agent, or Firm—Noel F. Heal; Robert W. Keller

[57] ABSTRACT

A comparison circuit having at least one processing cell in which objects defined by multiple parameters are streamed from a data base through the circuit, and compared with a similarly structured object previously stored in the cell. The object stored in the cell and objects streamed through the cell are all defined by data values indicative of maximum and minimum values of the parameters making up the objects. A match is declared when all parameters of the object stored in the cell overlap the parameter ranges of the objects streamed through the cell. With the use of multiple cells connected in series or in parallel, or in a combination of series and parallel, the processing speed of the comparison circuit is increased linearly with the number of such cells. Therefore, searching of large data bases can be performed at very high speeds and configurations of interconnected processing cells can be easily interconnected and loaded to define a number of objects of interest. Special processing features permit objects to be longer than a single cell, and permit multiple ranges of a parameter to be compared repeatedly with a single stored parameter.

11 Claims, 8 Drawing Sheets

MULTIFIELD IDENTIFICATION CIRCUIT AND RELATED METHOD OF OPERATION

BACKGROUND OF THE INVENTION

This invention relates generally to data comparison circuits and, more particularly, to circuits for comparing a large number of multifield or multidimensional objects, such as from a data base, with one or more similarly structured objects for which a match is sought. A common problem in searching data bases is to locate objects that match other selected objects, at least to some degree. Each object in the data base is defined in some consistent manner as comprising multiple fields of data. For example, each "object" or record in a data base relating to people may contain separate fields for name, address, age, height, weight, color of hair, color of eyes, and so forth. One type of use for such a data base would be to retrieve the record for a specific person whose name and address are known.

A more complex use is to identify the records in the data base that match a selected object description to some degree. For example, one might wish to identify the records that match a particular physical description, including height, weight, hair color, and so forth. There may be some fields that are not known, such as name and address, so it is necessary to treat these as "don't care" fields. Data base searches of this type are typically performed by software in large high-speed computers, but there is a larger class of data base search problems, both in military and nonmilitary applications, for which software searches are simply too slow. In some cases a data base search must be performed so rapidly as to satisfy the needs of a "real time" system, in which extremely rapid responses are needed.

At present, only a hardware-structured search device is capable of meeting the speed requirements of these applications, but the hardware available prior to this invention is not adequate to the task. Basically, a hardware data base searching device must address a data base by its content rather than by means of an addressing structure. Of course, various content-addressable memories have been available for some years, but depend on the identification of an exact match in a small hardware memory.

Ideally, what is needed is a data searching device that will handle a large data base extremely rapidly, for exact or inexact matches between data base records and predefined objects having the same record structure as the data base records. The present invention is directed to this end.

SUMMARY OF THE INVENTION

The present invention resides in a systolic machine having linked identical cells, each of which is capable of storing a definition of an object, and through which a data base is streamed at a rapid rate. A match determination is made in each cell and the cells may be connected serially, in parallel, or in a serial-parallel matrix, to provide an extremely rapid comparison between each object defined by the cells and all of the objects stored in the data base. Moreover, each field of each object in the cells and each field of each object in the data base may be defined in terms of a range or a set of upper and lower limits. Thus, each of the multifield comparisons can be made on an inexact basis or, if the ranges are reduced to zero, on an exact basis.

Briefly, and in general terms, the invention includes a comparison circuit having at least one processing cell capable of comparing one object defined by multiple parameters, with a large number of objects having a similar structure but different values for the parameters. Each processing cell comprises means for inputting a stream of data values of parameters of multiple objects stored in a data base, each parameter being defined as a maximum value and a minimum value; means for storing data values of parameters of at most one object, each stored parameter taking the form of a maximum value and a minimum value; means for comparing each parameter of the stored object with the corresponding parameter of each of the multiple objects streamed into the processing cell; and means for outputting the stream of data values from the processing cell in the same form in which they were input. The circuit also includes means for outputting match signals indicative of matches detected between the stored object and objects streamed through the processing cell. A match is the condition in which every parameter of the stored object has a range of values that overlaps the range of values of the corresponding parameter of an object streamed through the processing cell.

The circuit also includes means for synchronizing operations of the means for inputting, the means for outputting and the means for comparing. Input data values are gated into the processing cell at practically the same time that match signals and previously input data values are gated out of the processing cell, and processing continues in this pipe-lined or systolic manner, with data values being streamed through the cells and match signals being generated at times that permit them to be associated with particular streamed data records.

In the preferred form of the invention, the comparison circuit also includes at least one additional processing cell identical with and connected in series with the first. Data output from the first cell is input to the next cell in series, and the means for storing data in each processing cell defines no more than one object for comparison with the stream of multiple objects. Other configurations are possible, including multiple cells linked in parallel, and multiple series strings connected in parallel.

Ideally, the circuit of the invention also includes means responsive to an initialization signal, for conditioning the processing cell to receive values of parameters to be stored in the cell. In the initialization mode, data streamed through the circuit is stored in successive processing cells until initialization is complete, at which time the initialization signal is removed and the circuit is ready to operate in its comparison or identification mode, comparing input data with the previously stored data.

In the illustrative embodiment of the invention, data values are input as a succession of partial values having a fixed number of bits of data in parallel. The means for comparing includes means for saving an intermediate result obtained upon comparison of a portion of the input data value with a corresponding portion of the stored data parameter value, for possible use in the generation of a match signal when subsequent portions of the input data values are processed.

In one mode of operation of the comparison circuit, each object stored in the processing cells extends across more than one cell. Each cell further comprises means for transmitting to the next cell in series an intermediate comparison result based on the parameters stored in the cell, to permit the next cell to continue processing the comparison and developing an object-match signal.

In another mode of operation of the invention, the comparison circuit also includes means for processing multiple alternative parameter ranges for a single parameter of an object in the stream of input data values, including means for comparing each of the multiple alternative parameter ranges repeatedly with a single parameter range stored in the processing cell. A match is declared when any of the multiple alternative parameter ranges overlaps the stored parameter range.

In another mode of operation, an input data value is employed to define a parameter by a bit position within the data value, and the means for comparing includes means for masking selected bit positions to indicate a bit-level logical ORing function.

The invention may also be defined in terms of a novel method, including the steps of applying a clocking signal to the processing cells to control the movement of data values and control signals from cell to cell; moving data values from cell to cell in response to the clocking signals; storing data values of parameters of no more than one object, each stored parameter having a maximum value and a minimum value; and comparing each parameter of the stored object with the corresponding parameter of each of the multiple objects streamed into the processing cell. The method further includes the steps of generating match signals indicative of matches detected between the stored object and objects streamed through the processing cell, a match being the condition in which every parameter of the stored object has a range of values that overlaps the range of values of the corresponding parameter of an object streamed through the processing cell; and collecting match signals generated in the processing cells, for association with the objects streamed through the circuit.

It will be appreciated from the foregoing that the present invention represents a significant advance in the field of high-speed data comparison systems. In particular, the invention provides for extremely high processing rates that can be linearly increased merely by adding processing cells in series or in parallel with others. Exact or inexact matches are possible, with the inexact matches being defined by ranges of parameter values in the objects stored in the processing cells, or in the objects streamed through the cells, or both. Furthermore, larger objects may extend over more than one cell if necessary, and multiple preferred ranges can be defined for any number of parameters, so that one parameter range in an object may be compared against multiple parameter ranges in objects streamed through the comparison device.

Other aspects and advantages of the invention will become apparent from the following more detailed description, taken in conjunction with the accompanying drawings.

DESCRIPTION OF THE PREFERRED EMBODIMENT

Overview Of System Operation

Figure 1:
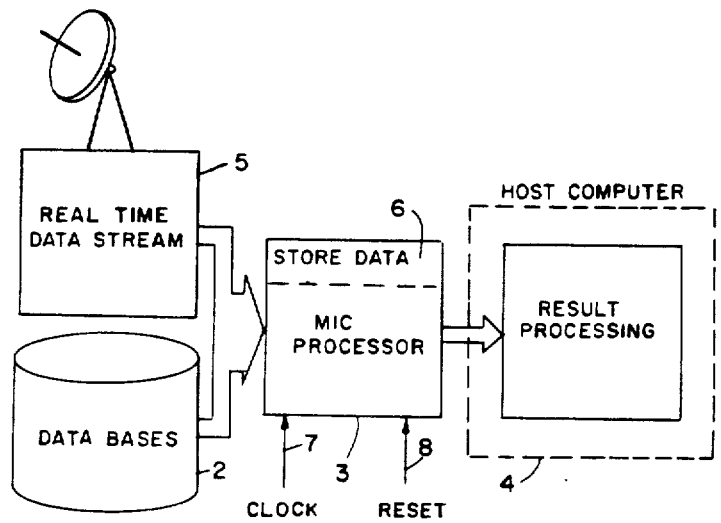
FIG. 1 is a system-level block diagram illustrating the environment of the invention.

As shown in the drawings for purposes of illustration, the present invention is concerned with circuitry for comparing selected items having multiple fields of data, with similarly structured items stored in a data base and streamed through the circuit of the invention. In this description, a number of synonymous terms are used to describe the same elements. In particular, the data base contains data relating to a large number of "objects" or "items." The data relating to one object or item is stored as one "record." Each record comprises multiple "fields," which are sometimes referred to as "dimensions" of the object or item, since the multiple fields may be thought of as defining an n-dimensional object or a vector in n-dimensional space.

In accordance with the invention, data and control signals are streamed through one or more cells or processing elements, each of which is configured to define an object for which a search is being made. In some applications, the object defined by a cell is not completely known; that is to say only some of its fields are known, and the objects defined in the data base are completely defined. In other applications, the known objects are defined in the cells and unknown objects are streamed through the comparison circuit. In any event, each object in the data base is compared with each object defined by a cell, and the results of the comparisons are made available to the user of the device.

FIG. 1 shows the environment in which the invention is best suited for use, including data bases, indicated by reference numeral 2, containing data values that define a large number of objects by maximum and minimum values of object parameters. These values are streamed through the apparatus of the invention, indicated at 3, and match results are collected by a host computer 4. In some applications, a real-time data stream may be fed into the comparison apparatus 3, as indicated by the block 5. This real-time data may be derived, for example, from optical or radar sensors, and preprocessed into the same parameter structure used to store data within the comparison circuit.

The system as so far described operates in a comparison or identification mode. Unknown objects may be defined by the data stored in the comparison circuit 3, and then compared against a stream of known objects from the data bases 2. Alternatively, unknown objects may be defined by real-time data values, and compared against a number of known objects stored within the comparison circuit 3. In both cases, the comparison circuitry operates in the same way.

Storing data in the comparison circuit takes place during an initialization mode of operation, initiated by the host computer 4. Data values stored in the comparison circuit 3 are indicated diagrammatically at 6. These values may come from a variety of sources, and are input along with a number of control signals, to be discussed in detail, including an initialization signal to condition the comparison circuit to store items of incoming data in internal memories. Other signals needed for operation of the comparison circuit are a clocking signal, shown on line 7, to synchronize operations of the several processing cells making up the circuit, and a reset signal on line 8, to reset various registers in the comparison circuit at the beginning of a new operation.

Figure 2:
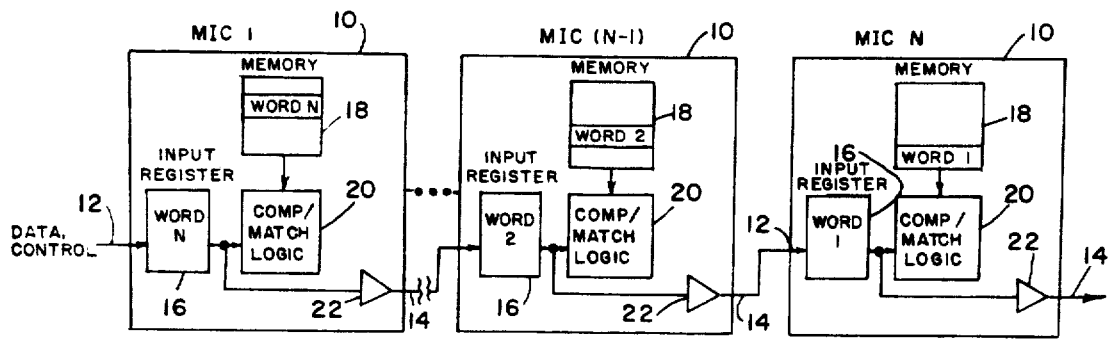
FIG. 2 is a block diagram of a comparison circuit in accordance with the invention, showing a configuration of series-connected processing cells.

FIG. 2 shows a typical series configuration of multiple processing cells, three of which are shown, indicated by reference numeral 10. In the series configuration, data is input to the first of the cells 10 from the data base over line 12, and after processing by the first cell, is transmitted to the next cell 10 in the string over an output line 14. Each cell 10 contains an input register 16, a memory 18 for the storage of objects, and comparison and match logic 20. The device of the invention provides a very high speed of comparison between the stored objects and the objects streamed in from a data base or real-time data source, principally because of the systolic or pipelined nature of the system architecture. The system does not operate by inputting an entire object into a cell and then performing a comparison with the stored object. Rather, once a single "word" of data has been clocked into a cell, a comparison can be made with the corresponding word in the object stored in memory. In the illustrative embodiment of the invention, a word of data includes one eight-bit byte of a minimum value, one eight-bit byte of a maximum value, and seven one-bit control signals.

As indicated in FIG. 2, for example, a total of N cells 10 are impliedly shown, and while cell #1 is processing word #N of data, cell #N is processing word #1. If a large number of cells are connected in series, a large number of simultaneous comparisons can be made with the streamed input data, since the time taken for the comparisons depends only on the time it takes to stream the data base through the string of cells. Adding to the length of the string adds very little to the overall processing time. For example, adding N additional cells to an existing string of N cells doubles the number of comparisons performed but adds only N cycles to the processing time, a cycle being the time taken to input a single data word to the series string.

Figure 3:
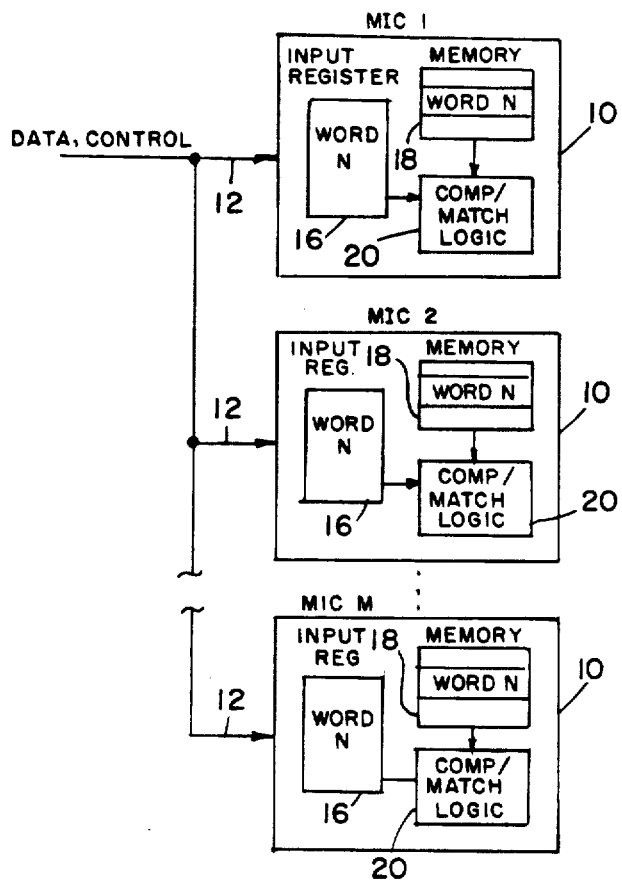
FIG. 3 is a block diagram of an alternate configuration of processing cells connected in parallel.
Figure 4:
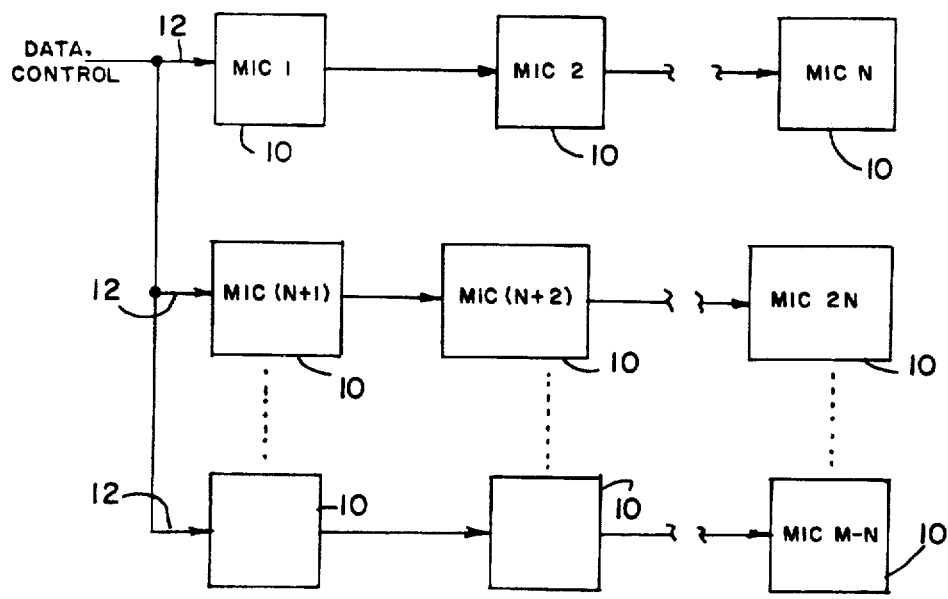
FIG. 4 is a block diagram of an alternate configuration of processing cells connected in a matrix or series-parallel configuration.

FIG. 3 shows an alternate configuration in which multiple cells are connected in parallel. As will be discussed in detail, each memory 18 has sufficient storage, in most cases, to define an entire object for which a search is being made. Therefore, the input data stream can be applied in parallel to multiple cells, for even greater processing capacity. FIG. 4 shows a matrix configuration of cells 10, comprising multiple, parallel-connected, series strings of cells. Although this configuration poses additional problems in the collection of match results, it provides for a dramatic increase in processing capacity.

Overview of A Single Cell

Figure 5:
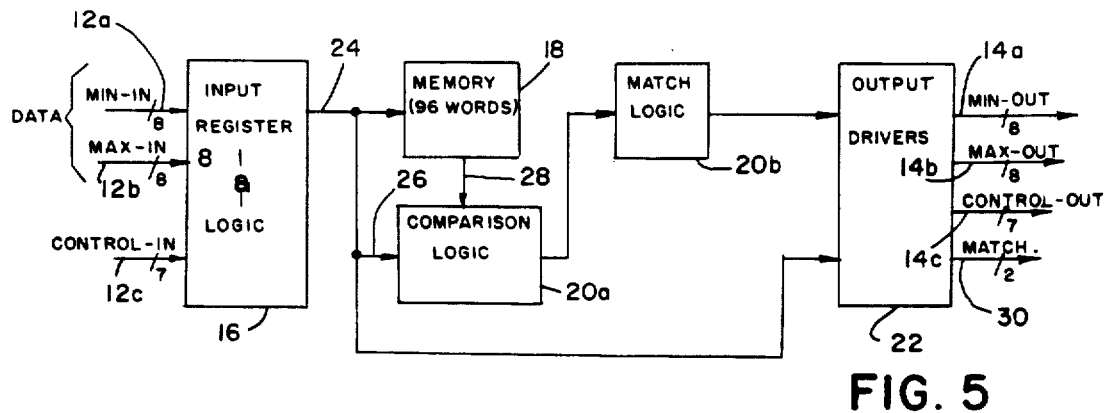
FIG. 5 is block diagram of a single processing cell of the invention.

FIG. 5 is a top-level block diagram of a processing cell 10, showing the major functional components. These include the input register 16 and related logic, the memory 18, and comparison and match logic 20, here shown as two components: the comparison logic 20a and the match logic 20b. Also shown are a set of output drivers 22, which provide necessary signal amplification for output signals passed to the next cell in a series string of cells. Data signals enter the input register 16 over two sets of input lines 12a and 12b, one of which is for maximum data values and the other of which is for minimum data values. In the system architecture of the invention, both the streamed in data and the records stored in the cells contain maximum and minimum data values for each field of each record.

The minimum values are input over line 12a, which is an 8-bit-parallel line, while the maximum values are input over line 12b, which also handles eight bits at a time. This is not to say that the data values are limited to eight bits, only that they are input to the cell eight bits at a time. For each clock cycle applied to the cell, eight bits of a maximum value and eight bits of a minimum value are input to the input register 16. At the same time, seven control bits are input on line 12c. For simplicity, clocking signals have not been shown in the figure.

The cell 10 has two basic modes of operation: an initialization mode during which values received over the data input lines 12a and 12b are stored in the memory 18, as indicated by line 24 from the input register 16 to the memory, and an identification mode, in which data received in the input register 16 is transmitted to the comparison logic 20a, over line 26 and compared with data from the memory 18 received over line 28. The comparison and match logic 20 generate match signals that are passed to the output drivers 22 and are transmitted out of the cell over match lines 30. The data and control signals input on lines 12a, 12b and 12c are transmitted out of the cell on lines 14a, 14b and 14c, respectively, for similar processing by successive cells in a series string.

It will, of course, be understood that the sizes of the registers and memories in this illustrative embodiment of the invention are not intended to be limiting, but only exemplary of the principles of the invention. Different applications may require different configurations and circuit parameters.

Figure 6:
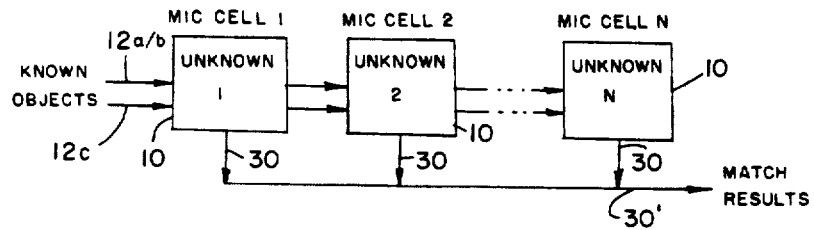
FIG. 6 is a block diagram showing a string of processing cells connected in series and illustrating how match are collected.

The collection of match results from a string of cells can perhaps best be understood from the block diagram of FIG. 6, which also shows a number of cells 10 connected in series. A data line 12a, 12b is shown as being input to the first cell, and control lines 12c are also input to the first cell. Both the data lines and the control lines pass serially through the cells 10 and emerge as the output lines 14a–c from the last cell. The match result lines 30 emerge from each cell 10 and are, in effect, ORed together to provide a composite match indicated at 30'. The function of interpreting the match signals is performed by the host computer, which also controls the modes of operation of the cells, but is not a feature of the present invention. Basically, the time of occurrence of a match signal is indicative of the streamed record with which a match was made. Since records are streamed through the cells in two sets of only eight bits each per clock cycle, an entire record will usually span more than the number of cells in the series string. Hence it is not usually possible for more than one match signal to be generated at the same time in the string. A match signal can only be generated as the last eight-bit bytes of data in a record are being processed in a cell. If the record occupies, for example, sixty-four pairs of eight-bit bytes, successive end-of-object indicators in the streamed data would span sixty-four cells and there would need to be at least sixty-five cells in series to produce two simultaneous match signals from the string of cells. When large strings of cells are used, or when the cells are connected in parallel or in a matrix configuration, the match results can be collected on multiple lines to avoid any ambiguity of results.

Initialization Mode

As already mentioned, one mode of operation of the cells is the initialization mode, in which data words are stored in the memory 18. An initialization signal, labeled INIT-IN is one of the control signals input on line 12c, and its state is used in the cell to control various gates and registers used to load the memory. Each memory word contains one eight-bit byte from the minimum input line 12a, one eight-bit byte from the maximum input line 12b, and two control bits from the control input line 12c. Thus each word of memory contains a total of 18 bits. Two other important control bits received on the input lines are the end-of-parameter signal and the end-of-object signal. At the beginning of a period of initialization, the first eight bits of minimum and maximum values of a first parameter are input to the first cell in a string and are stored in the first word of memory. Successive pairs of eight-bit bytes are stored in successive word locations of the memory.

Figure 7:
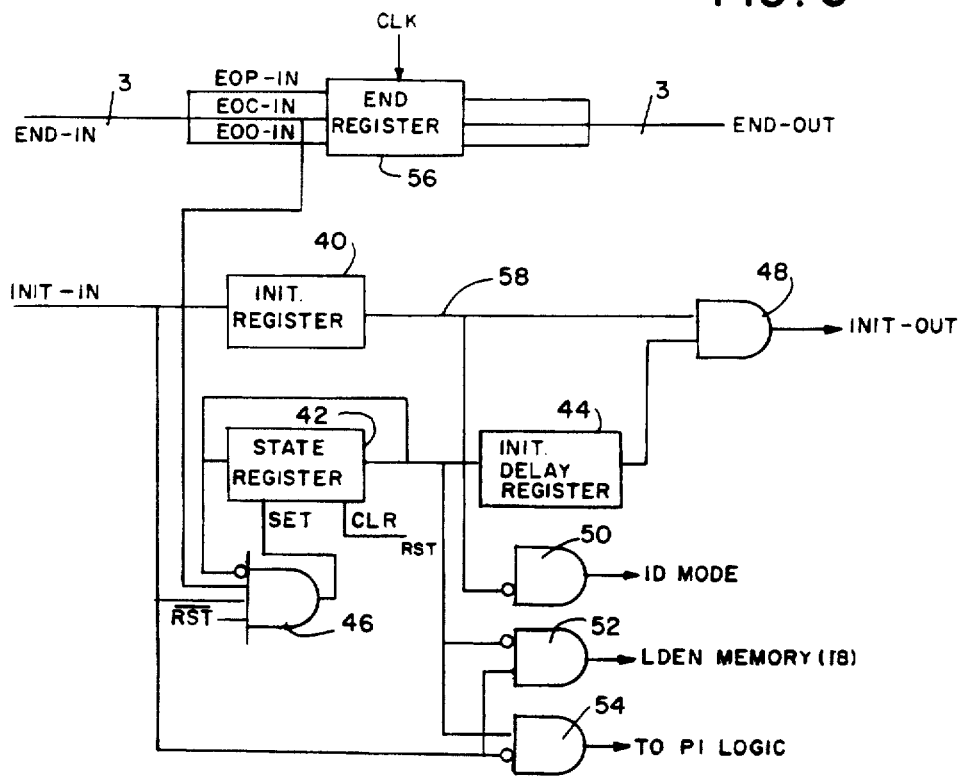
FIG. 7 is a fragmentary logic diagram illustrating how a processing cell is conditioned for its initialization mode of operation.
Figure 18:
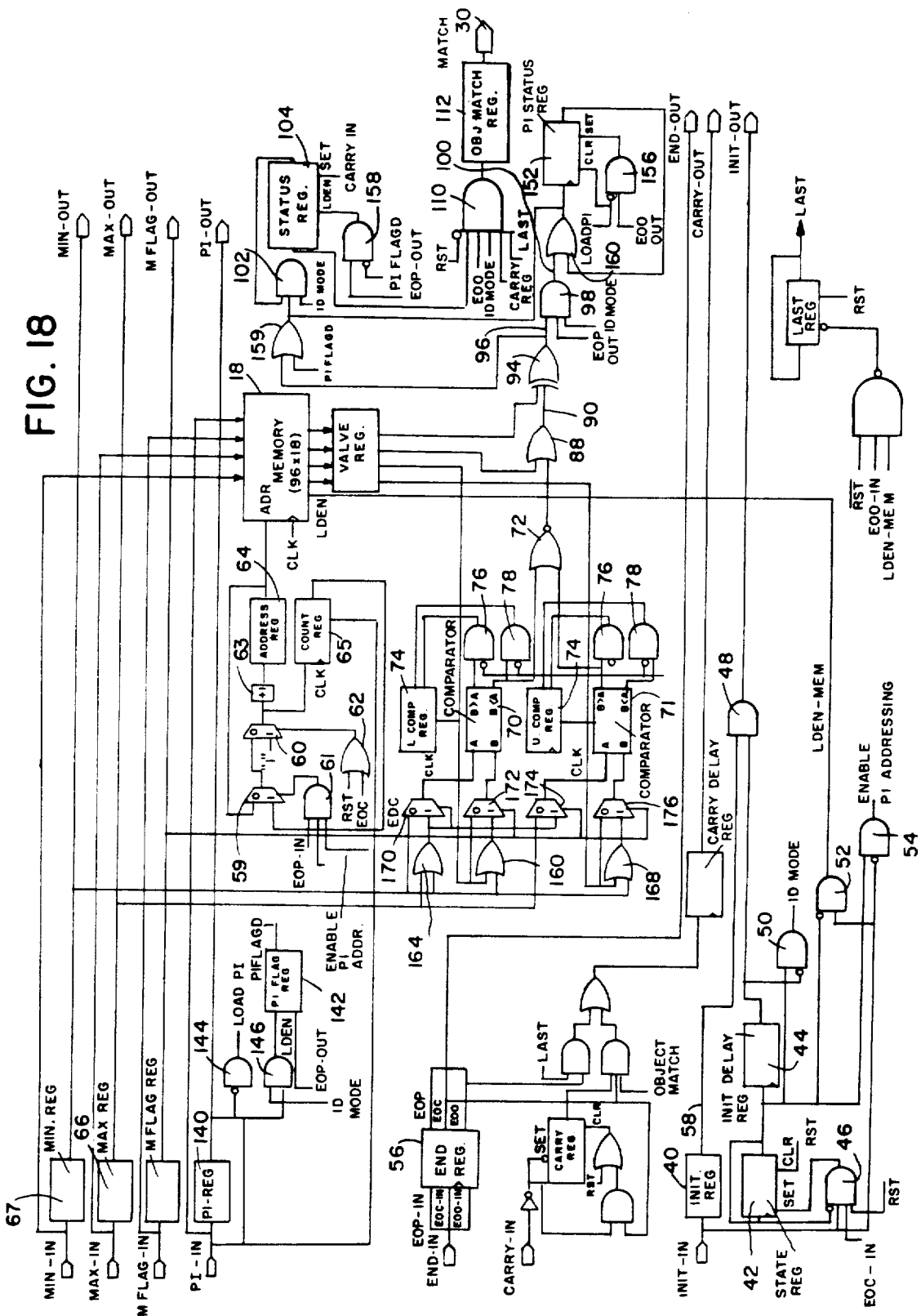
FIG. 18 is a complete logic diagram of a single processing cell of the invention.

After the first cell in the string has been loaded with data, subsequently appearing data must be transmitted through the first cell to the second cell, and so forth until the entire string of cells is initialized. The manner in which this function is performed is best understood from the detailed cell schematic of FIG. 18, which is provided by way of completeness. For purposes of explanation, the schematic has been represented in fragments pertaining to the various functions it performs, and identical reference numerals are applied to corresponding components in the fragmentary drawings and in the complete schematic. FIG. 7 is the first of these fragmentary drawings, and relates specifically to the initialization mode of operation.

Four of the seven control lines 12c are represented in FIG. 7, including the three END lines and the INIT line. The END lines indicate end-of-parameter (EOP), end-of-cell (EOC) and end-of-object (EOO), respectively. The end-of-parameter line becomes a "1" when the last word of data in a parameter or field is clocked into the cells. The end-of-cell flag is used to denote the last word of data to be stored in a cell. This is to be distinguished from end-of-object, since an object may be (but is usually not) large enough to be stored in more than one cell.

The initialization logic includes an initialization register 40, a state register 42, an initialization delay register 44, an AND gate 46 associated with setting of the state register, an AND gate 48 in the initialization line, and three additional AND gates 50, 52 and 54 that provide additional control signals internal to the cell. Also shown is an END register 56 in which the three END-IN signals are received, and which provides three corresponding END-OUT lines.

The INIT-IN line is applied as an input to the initialization register 40, the output of which, on line 58, provides one input to AND gate 48. The output of AND gate 48 is the INIT-OUT line. The INIT-IN line is also connected as one input to AND gate 46, which has three other inputs. One is an inverted RESET signal used to reset the entire cell circuitry. Another is the EOC signal derived from the END-IN line, and the remaining input is the inverted output of the state register 42. The output of AND gate 46 is applied to the SET terminal of the state register, which is cleared only by a RESET signal applied to its reset terminal. The output of the state register is applied not only to the AND gate 46, but also to the initialization delay register 44, as one input to AND gates 50 and 54, and as an inverted input to AND gate 52. Finally, the output of the initialization delay register 44 is applied as a second input of AND gate 48, to enable or disable the INIT-OUT line.

When initialization data is first received by the cell, the INIT-IN line is a "1", which sets the initialization register. However, the state register, which was cleared initially by a reset signal, remains at a "0" condition, since there is no EOC signal to enable AND gate 46. Therefore, the initialization delay register 44 also remains clear, and AND gate 48 prevents the INIT-OUT signal from propagating through to the next cell in the string. Further, AND gate 52 generates a "1" output because its inputs are the INIT-IN signal and the inverted state register output. The output of AND gate 52 is used to enable loading of the memory 18 of the cell. As will be discussed later with reference to addressing of the memory 18, words of the memory are accessed sequentially starting at a zero address. The data input lines 12a and 12b are connected directly to the memory data inputs, and a word of data is stored into the memory on each clock cycle.

When the entire object has been loaded, or that part of an object to be stored in one cell, an end-of-cell signal will appear as a "1" on the EOC-IN line. This will provide the remaining enabling signal for AND gate 46 and will result in the setting of the state register 42 to a "1". On the next clock cycle, the "1" output of the state register 42 will be clocked into the initialization delay register 44, the output of which will enable AND gate 48 and permit the INIT-IN signal to propagate through to the INIT-OUT line to the next cell in the string. Also, AND gate 52 will be enabled by the "1" output of the state register, and the load-enable signal for the memory will fall to a "0," so that further data arriving at the cell will not be stored in the memory. Now that the INIT signal has been propagated out of the cell, the next cell will function in the same way as described for the first cell and will store in memory the data arriving by way of the first cell.

AND gate 50 provides an ID mode signal, which is used to enable the comparison and match logic 20 to perform its intended functions. So long as the INIT-IN line is a "1" or the state register is a "0," the ID mode line will remain at "0." After the state register has been set by the arrival and storage of data in this cell, and the initialization mode is completed by the lowering of the INIT-IN line to "0" then the ID mode line will assum a "1" condition and the cell will be ready to begin operation in the identification mode.

Memory addressing will be discussed with reference to a mode of operation relating to "preferred intervals," but the diagram used for this purpose will also serve to explain memory addressing in the initialization mode.

Figure 8:
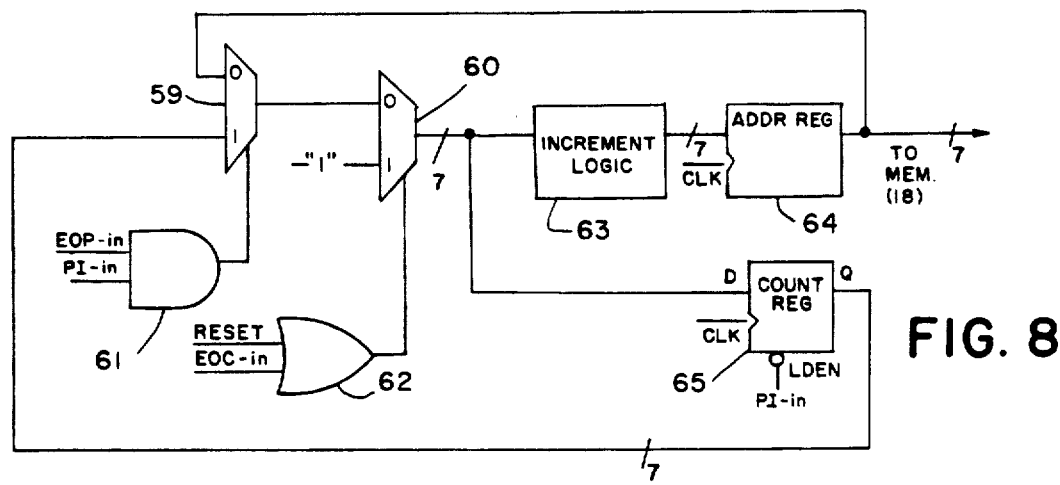
FIG. 8 is a fragmentary logic diagram illustrating memory addressing functions of the processing cell.

FIG. 8 shows the memory addressing logic as including two multiplexers (MUX's) 59 and 60, an AND gate 61 controlling the first and an OR gate 62 controlling the second. Also included are incrementing logic 63, an address register 64, and a count register 65. Each MUX has a logical 0 input and a logical 1 input, and a single output. The input is selected by the state of a control line applied to the MUX. The first MUX 59 receives its "0" input from the output of the address register 64, its "1" input from the output of the count register 65, and its control signal from the output of AND gate 61. The second MUX 60 receives its "0" input from the output of the first MUX 59, its "1" input from a hard-wired signal representing a count of −1, and its control signal from the output of the OR gate 62. The output of the second MUX 60 is applied to the incrementing logic 63 and as a D input to the count register 65. The incrementing logic merely increments its input by a count of 1 and applies its output to the input of the address register 64. The output of the address register is then applied to the first input of the first MUX 59 and to the address lines of the memory 18 of the cell.

Operation of this logic in the initialization mode is relatively simple, since the AND gate 61 is disabled. Its two input signals are the EOP-IN signal and a preferred interval signal (PI-IN), which has yet to be discussed, but which will be zero at all times during initialization. Thus, the "0" input of MUX 59 will always be selected during initialization. The OR gate 62 that controls the second MUX 60 has two inputs: the reset signal and the EOC-IN signal. Initially, a reset signal will result in the selection of the "1" input of the MUX 60, which will result in a −1 count being input to the incrementing logic, and a 0 count emerging from the logic and being applied to the address register 64. Initially, then, a zero address is selected in the memory 18 of the cell. On the next clock cycle, the reset signal is no longer present and the "0" inputs are selected on both MUX's. The contents of the address register 64 are cycled through the incrementing logic 63 and back to the address register with a value of +1. Thus the next memory address is +1, and the next +2, and so forth until the EOC-IN signal appears to indicate the end of data to be stored in this cell. Then the OR gate 62 will select the "1" input of the MUX 60 again, and a zero will be placed in the address register. The address register will continue to be cycled through a range of values, but on this occasion no data will be stored in the memory because, as explained with reference to FIG. 7, the load-enable signal to the memory will be lowered to "0" after the cell has had its memory initialized.

Identification Mode

In the identification mode, the INIT-IN line applied to the cell will be a "0" and the ID mode signal generated internally in the cell will be "1." It should be understood that a series string of cells may have its first cell in the identification mode while second and subsequent cells are still completing the initialization mode. Therefore, the discussion of identification mode is properly limited to a single cell, at least in the usual case in which an object may be stored entirely within one cell. The case in which an object may occupy several cells will be discussed later.

Figure 9:
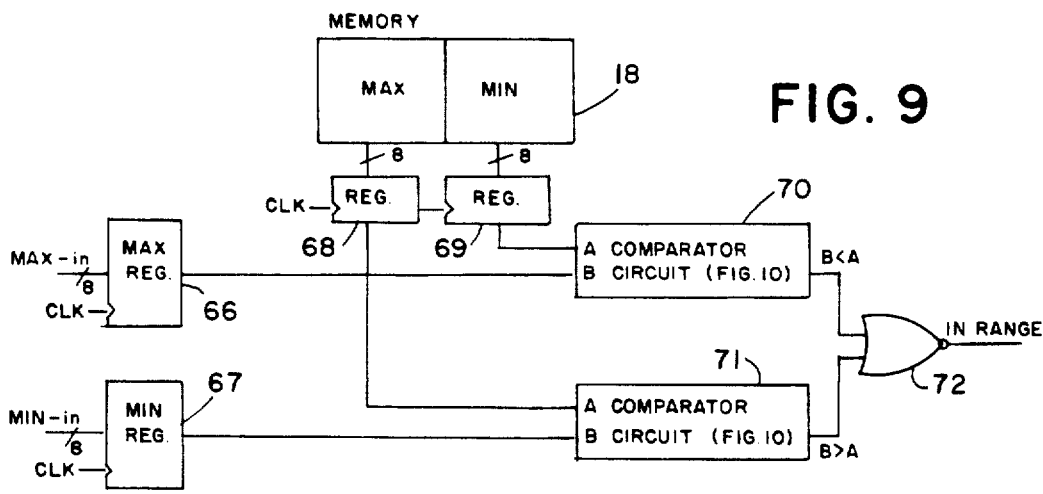
FIG. 9 is a fragmentary logic diagram illustrating a range comparison circuit of the processing cell.

In the identification mode, data to be compared with stored data will be received one word at a time on the input lines 12a and 12b. A word of data includes one eight-bit byte of minimum value data, one eight-bit byte of maximum value data, and seven control bits, two of which are the MFLAG and the PI flag, the meanings of which will be subsequently explained. As shown in FIG. 9, the data bytes are stored initially in registers called the maximum register 66 and the minimum register 67. Corresponding bytes from the object stored in the memory 18 are retrieved from the memory and held in registers 68 and 69. The memory is accessed in the same manner as was described in relation to the initialization mode. In other words, the memory address is initialized to zero and incremented one word location at a time at each clock cycle.

Two comparator circuits 70 and 71 are employed to perform the two comparisons needed to determine whether the maximum-minimum range of the parameter retrieved from memory overlaps any part of the maximum-minimum range of the parameter received over the data lines 12a and 12b. In the first comparator circuit 70, the minimum value from memory is compared with the maximum value from the data input lines. A logical "1" output is generated if the minimum value from memory exceeds the maximum value from the data input lines. This is one of two possible no-match conditions, indicating that the entire memory range is above the input data range. The other no-match condition is detected in the second comparator circuit, which generates a "1" output if the minimum value from the input lines is greater than the maximum value from the memory, indicating that the entire input data range is above the memory range. The two outputs from the comparator circuits 70 and 71 are connected as inputs to a NOR gate 72, the output of which is an in-range signal, i.e. it has a logical "1" value only if the ranges of the memory and input data values overlap to some degree.

Figure 10:
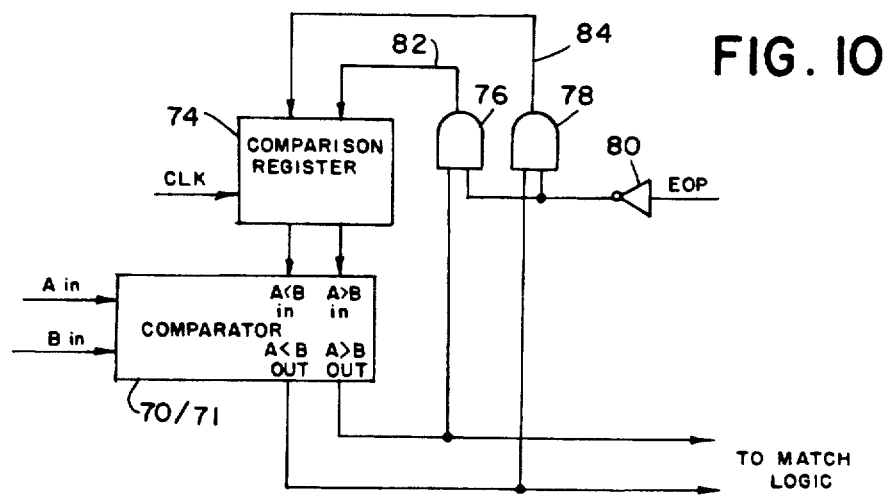
FIG. 10 is a fragmentary logic diagram illustrating additional aspects of the comparison circuit.

The preceding paragraph describes the process of matching a single byte of data from memory with a corresponding byte of data from the input data lines. Since a single parameter may occupy several adjacent bytes, the process of parameter matching is a little more complicated than this. Each of the comparator circuits 70, 71 also includes, as indicated in FIG. 10, a comparison register 74, two AND gates 76 and 78, and an inverter 80. Instead of the single output indicated in FIG. 9, each comparator circuit actually has two outputs: an A<B output and an A>B output. One of these outputs is coupled to the NOR gate 72 of FIG. 9, but both are coupled as inputs to respective AND gates 76 and 78. The other input to the AND gates is the EOP (end-of-parameter) signal derived from the END-IN control lines referred to earlier. The EOP signal is inverted in inverter 80 and applied as an input to both AND gates 76 and 78. Consequently, the presence of an EOP signal disables both AND gates. On the other hand, so long as there is no EOP signal the AND gates 76, 78 are enabled, and the output signals from the comparator 70, 71 are passed through the AND gates and transmitted over lines 82 and 84, respectively, to the inputs of the comparison register 74, which is a two-bit register. The comparison register 74 has the possible values 01, indicating A>B, 10, indicating A<B, or 00, indicating A=B in the previous comparison.

The data values are compared beginning with the least significant byte. All that is required is a simple binary comparison, not a subtraction with full carry capability from byte to byte. A determination as to which of two quantities is greater can usually be made by a comparison of the most significant stage, whether this be a decimal, octal, binary, or some other type of stage. In this instance, the comparison is being made in one-byte or eight-bit stages. The last, and most significant, comparison will be determinative of the result unless the comparison detects equality, in which case the next most significant stage will be determinative. But if it, too, indicates equality, one has to go to the third most significant stage, and so forth. This will be clear from a numerical example. In comparing the decimal quantities 315 and 269, it is the most significant stage, the hundreds column, that determines that 315>269. But in comparing 215 and 269, one has to go to the second most significant stage, the tens column, to determine that 215<269. If both first and second stages were equal, as in comparing 269 with 261, one must go to the least significant stage to determine that 269>261.

What this means in the context of a comparison technique that compares the least significant stages first, is that the result of comparing the least significant stages must be preserved until the second-least significant stages are compared. If the second-stage comparison does not find equality, the first-stage comparison may be discarded, but should otherwise be retained. In other words the result of a comparison at any stage cannot be discarded until a determination of inequality is made in a higher stage. The comparator circuit of FIG. 10 achieves this goal quite simply by saving the state of inequality determined in each stage in the comparison register 74. The contents of this register is used only if there is a determination of equality on the next comparison stage. Then the comparator circuit 70, 71 gates the value stored in the comparison register 74 through to the outputs of the comparator circuit. In effect, stages at which equality is detected are "skipped" and the result from the previously compared stage is preserved in case there is equality in all of the succeeding stages of higher significance.

The in-range signal that appears at the output of the NOR gate 72 in the comparison circuit is still only a byte-match condition and has parameter-match significance only at the end of a complete parameter. It will ultimately be ANDed with the EOP signal to derive a parameter-match signal, but is first further processed by two optional control bits that are stored in memory at initialization time. These are the match-all and match-not signals. They are input for convenience on the control signal lines referred to by MFLAG-IN and PI-IN, respectively, and these lines are used for different purposes when data is streamed in from the data base over the data and control lines 12a, 12b and 12c.

Figure 11:
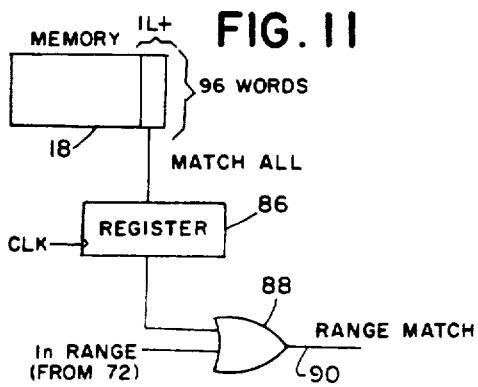
FIG. 11 is a fragmentary logic diagram illustrating a "match-all" function used in generating a match signal.

The match-all bit is retrieved from the memory 18 with the other corresponding data bytes and is held in a register 86, as shown in FIG. 11. The output of the register 86 is applied as an input to an OR gate 88, the other input of which is the in-range signal from the output of NOR gate 72 in FIG. 9. The presence of a "1" in the match-all bit is, in effect, a "don't care" indicator. Regardless of the state of the in-range line from the comparison circuit, a range match signal will always be generated on the output from the OR gate 88, on line 90. The match-all bit is useful in making comparisons with objects for which not all of the parameters are known. When the match-all bit is set for the unknown parameters, any values of these parameters in the streamed data objects will produce a match.

The other control bit treated in a similar fashion is known as the mask-not bit, which has the effect of inverting the range-match signal on line 90. If a byte has been interpreted as in-range in the comparison logic, a "1" in the match-not flag will provide an output, referred to as byte-match, of "0" or non-match. The match-not logic, shown in FIG. 12, includes a register 92 and an exclusive OR (XOR) gate 94. The XOR gate has as inputs the range match signal on line 90 and the output of the register 92, which derives its input from the memory 18. The output from the XOR gate 94, on line 96, is referred to as the byte-match signal. It represents the match or no-match condition of the stored and streamed parameter up to the current byte being processed. It does not represent a parameter match until the most significant byte of the parameter has been processed in the comparison logic. The byte-match signal is input to an AND gate 98 having two other inputs. One is the EOP (end-of-parameter) signal and the other is the ID mode signal indicating that the cell is in identification mode. The output of the AND gate 98, on line 100, is the parameter-match signal.

Figure 13:
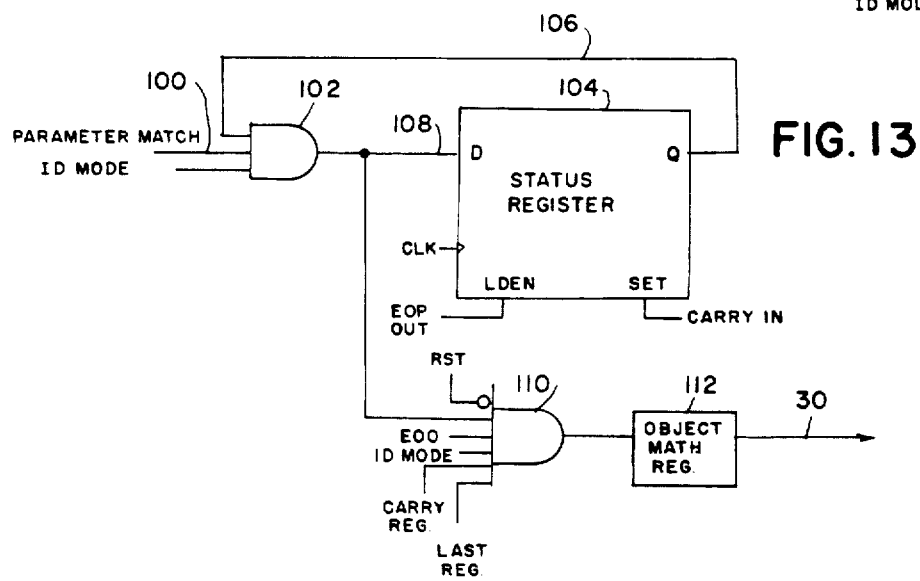
FIG. 13 is a fragmentary logic diagram illustrating the generation of an object-match signal.

The next step in processing is to derive an object-match signal from the successive parameter-match signals. As shown in FIG. 13, the additional components needed for this step include another AND gate 102 and a status register 104. At the beginning of processing an object, the CARRY-IN control signal, to be discussed, sets the status register 104 to a "1." The output of the status register 104 is fed back to its D input over line 106 and through the AND gate 102. The other significant inputs to the AND gate 102 are the parameter-match signal on line 100 and the ID mode signal. So long as the parameter-match signal remains a "1", indicating that all of the parameters have matched to date, a "1" value will continue to be circulated through the status register 104. At the end of the object, the object-match signal can be derived from line 108 between the AND gate 102 and the status register 104. This signal is applied to another AND gate 110, the other inputs of which include the EOO (end-of-object) signal, an inverted reset signal, the ID mode signal, and two other signals that have yet to be discussed. In the normal identification mode of operation, the AND gate 110 will be enabled only if there is no reset signal and if an EOO signal is present. If this is the case, the object-match signal on line 108 is then gated through to the input of an object-match register 112. This register provides the match data for use outside the processing cell.

Multiple-cell Objects

Figure 14:
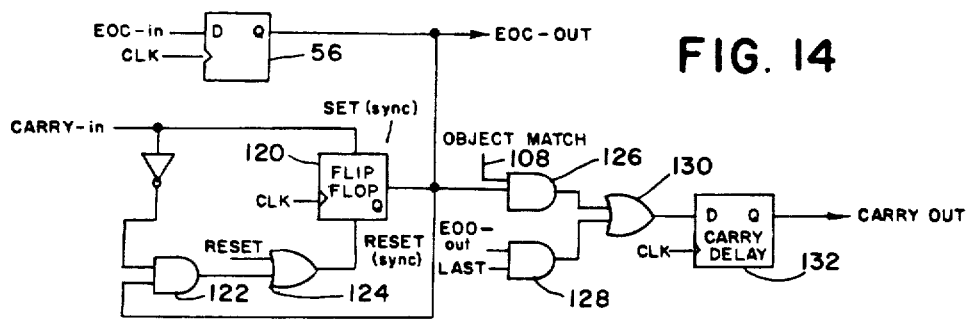
FIG. 14 is a fragmentary logic diagram illustrating the handling of multi-cell objects.

If a record or object requires more than one cell for storage, i.e. more than 96 words of storage in the illustrated embodiment, the object may be extended across multiple cells. The only limitation is that each field or parameter of the object must fit in one cell and may not overlap two or more cells. To accomplish this, when the EOC (end-of-cell) signal is detected the match condition determined up to that point must be passed to the next cell. This is the purpose of the CARRY control signal, now to be described with reference to FIG. 14.

The CARRY-IN signal is a "1" at the start of processing an object, and is stored in a carry register 120. The logic for resetting the carry register 120 includes an AND gate 122 and an OR gate 124. The AND gate 120 has as inputs the inverted CARRY-IN signal and the EOC-OUT signal derived from the END register 56. The remainder of the carry logic includes two additional AND gates 126 and 128, an OR gate 130 and a carry delay register 130. AND gate 126 derives one input from the carry register 120, a second input from the EOC-OUT signal and a third input from the object match signal on line 108. The other AND gate 128 has one input from a LAST register (not shown in FIG. 14) and one from the EOO-OUT line indicating end-of-object. The outputs of the two AND gates 126, 128 are input to the OR gate 130, and the output of the OR gate is connected as the D input to the carry delay register 132, which provides the CARRY-OUT signal from its output.

There are two sets of conditions that will set the carry delay register and the CARRY-OUT signal to "1." First, if there is an EOC-OUT signal of "1," an object match signal of "1" and the carry register is set to a "1," then AND gate 126 will generate a "−1" output to set the carry delay register 132. This will pass a "1" CARRY-IN signal to the next cell when end-of-cell is detected and the object-match signal indicates a match for the comparison of the object to this point. It will be recalled that the object-match signal is initially set to a "1" and remains in this state so long as no non-matching parameters are detected. Accordingly, if the object-match signal is a "1" at some intermediate point in time before the end-of-object signal is received, then no non-matching parameters have been detected up to this point in the comparison.

The second set of conditions that will result in a "1" state for the CARRY-OUT signal occurs when the end-of-object is detected in the last cell in the string that is used to define a stored object being compared. Then AND gate 128 will generate a "1" output and this will propagate through the OR gate 130 and the carry delay register 132.

It will be recalled that a "1" CARRY-IN signal sets the status register to a "1" at the beginning of the comparison of an object. Therefore, for multiple-cell objects the CARRY-IN signal has the following possible effects. If the CARRY-IN signal is a "1," this could mean that the cell is the first in a string defining an object being searched for, and that the "1" in its CARRY-IN line was generated because the previous cell was a "last" cell that had received an end-of-object signal. A "1" in the CARRY-IN signal might also mean that the previous cell in the string had detected an end-of-cell condition coupled with an object-match signal, that is to say a match condition from the previous cell is being passed to this cell in order to continue the comparison process. A "0" CARRY-IN signal will clear the carry register 120 when the next EOC is detected, and will mean that a "1" will not be propagated out onto the CARRY-OUT control line unless this is a "last" cell.

When multiple cells are used to define a single object, only one of the cells will be performing a comparison at any given time. This is determined by which cell has received a "1" CARRY-IN signal. Initially, the first cell in the string receives a "1" CARRY-IN signal and the second and subsequent cells receive "0" and effectively perform no comparison processing. Only after an end-of-cell condition does the first cell pass a "1" to the next cell, and then only if a match condition still holds for the object being compared. Meanwhile, the CARRY-IN signal applied to the first cell drops to "0" and data received in the first cell is not compared but merely passed through. The second cell performs no comparison during receipt of the first "cell-full" of data, since its CARRY-IN signal is "0." Upon receipt of a "1" on its CARRY-IN line, the second cell begins a comparison process, and generates a "1" CARRY-OUT signal only if the match condition continues to hold at the next end-of-cell. Finally, the last cell defining the stored object always generates a "1" CARRY-OUT signals after the entire object has been processed, since the next following cell must be a "first" in a new string.

In effect, the CARRY signal is a token that is passed from cell to cell in the string that defines an object. The token indicates to the cell receiving it whether or not comparison processing is necessary, and the token may be "dropped" if the continuing comparison process finds a non-matching parameter. If a cell receives a "0" on its CARRY-IN line, this means either that it is not time for the cell to perform its part of the comparison process, or that a non-matching parameter has been detected in an earlier cell. In either case, no comparison processing is needed in the current cell.

Figure 12:
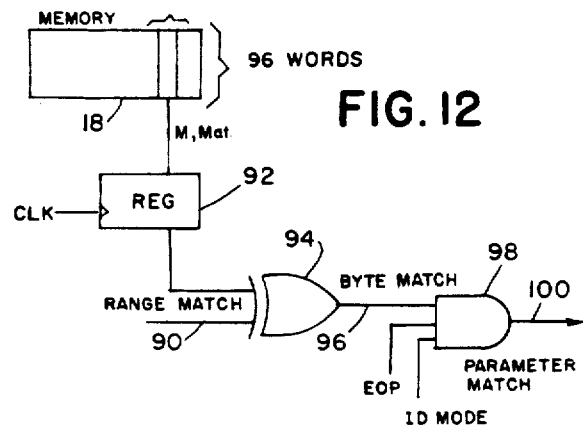
FIG. 12 is a fragmentary logic diagram illustrating a "match-not" function used in generating a match signal.

The last cell in each string is the only one from which match signals are to be generated for use outside of the cell configuration. A match condition generated in an earlier cell is only of use in passing to the next cell in series, but should not be permitted to indicate an object-match condition. Accordingly, the "last" condition is also employed as an input to AND gate 110 (FIG. 12). Therefore, the object match register 112 is set only in the last cell of the string defining an object, and only then, of course, if there is a match.

The last register is an internal register that is set during initialization when both an end-of-cell and an end-of-object condition are sensed at the same time. For the usual configuration in which each object can be defined in a single cell, every cell will be a "last" cell and the last register will always contain a "1." The carry logic of FIG. 13 will then always operate to generate a "1" CARRY-OUT signal to the next cell in the series.

Types Of Comparisons

Figure 15A:
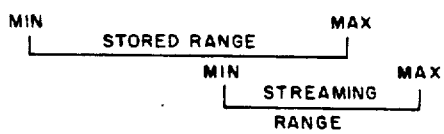
FIGS. 15a–15f are diagrams illustrating various match conditions identifiable by the comparison circuit of the invention.

The types of comparisons possible with the circuit of the invention are shown diagrammatically in FIGS. 15a–15f. The most general is shown in FIG. 15a, in which the stored-object range and the streaming object range overlap. As discussed earlier, if the ranges overlap to any degree at all, a match will be declared by the comparison logic of the invention.

Figure 15D:
Figure 15B:
Figure 15E:
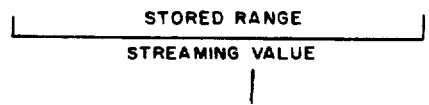
Figure 15C:
Figure 15F:
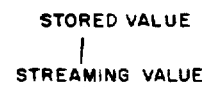

The other figures (15b–15f) are special cases of overlapping ranges that may be encountered in particular applications. FIG. 15b shows the case where the stored range is contained wholly within the streaming range, and FIG. 15c shows the case in which the streaming range is contained wholly within the stored range. FIG. 15d shows the case in which the stored value is an exact value, defined by identical maximum and minimum values, falling within the streaming range. FIG. 15e shows the case in which the streaming value is an exact value falling within the stored range. Finally, FIG. 15f shows the simple case of two exactly matched single values for the stored and streaming values.

Processing With Preferred Intervals

"Preferred intervals" is a term used to describe a comparison situation in which there may be more than one range of values that are preferred for a parameter. One way of handling this problem would be to define multiple objects having identical parameter ranges except for the parameter having several preferred ranges. Thus, if an object has one parameter with three preferred ranges it would take three cells or three words in the input data stream to define the object to include all three preferred ranges of the parameter. Although this is a simple solution to the preferred intervals problem, it becomes unwieldy in applications in which multiple parameters in the object have multiple preferred intervals or ranges. For example, if four parameters each have four preferred intervals, it would require $4^4$ or 256 objects to define all possible combinations of the preferred intervals. Accordingly, it would be more desirable to provide a simpler way of defining multiple preferred intervals in a single cell, or in the data base. The scheme to be described permits the multiple preferred intervals to be defined in the data base streamed through the cells. Logic internal to each cell provides for multiple ranges streamed through the cell to be compared repeatedly with the same stored parameter range.

Figure 16A:
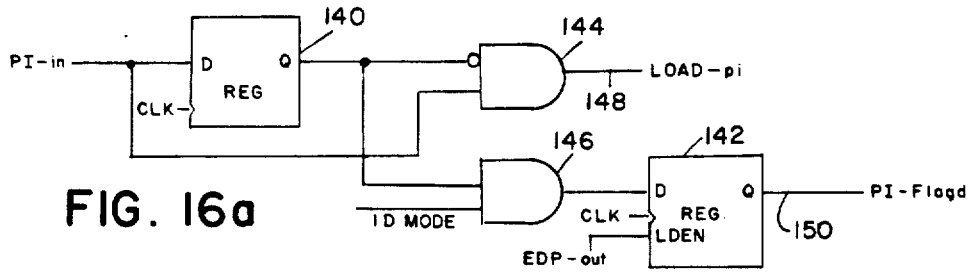
FIGS. 16a and 16b are fragmentary logic diagrams illustrating the processing of preferred intervals.
Figure 16B:
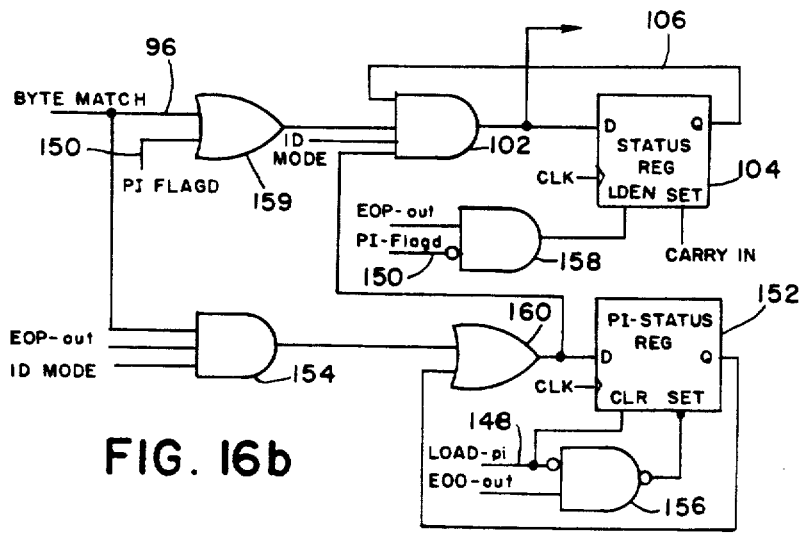

The logic for handling preferred intervals is shown in FIGS. 16a and 16b, taken together with FIG. 8. FIG. 16a illustrates the preferred interval flag logic, and includes a PI register 140, a PI delay register 142, and two AND gates 144 and 146. A PI control signal is input to the PI register 140 over the PI-IN line, and is also connected as one input to AND gate 144. The output of the PI register 140 is connected in inverted form as the other input to AND gate 144, and in non-inverted form as an input to the other AND gate 146. The other input to AND gate 146 is the ID mode signal, indicating that the cell is in identification mode. The output from the first AND gate 144 is a load-PI signal on line 148, which is used in FIG. 16b. The output from the other AND gate 146 is connected as an input to the PI delay register 142. This register has a load-enable terminal to which the EOP-OUT signal is connected, and has an output on line 150 identified by the name PIFLAGD.

The preferred interval logic shown in FIG. 16b includes some components already described with reference to FIG. 13, namely the status register 104 and its associated input AND gate 102. Other components not yet introduced include a PI status register 152, three additional AND gates 154, 156 and 158, and two OR gates 159 and 160. It will be recalled that the status register 104 is initialized to a value of "1" by each CARRY-IN signal at the start of a new object comparison, and is maintained at a "1" value so long as byte match signals are received at each end-of-parameter. AND gate 102 has four inputs: one fed back over line 106 from the output of the status register 104, a second one connected to the output of OR gate 159, a third one from the ID mode line, and a fourth from the output of OR gate 160. OR gate 159 has two inputs: the byte match signal on line 96 and the PIFLAGD signal on line 150. The byte match signal on line 96 is also connected as one input to AND gate 154. The other two inputs are the ID mode line and the EOP-OUT line. The output of this AND gate 154 is applied as an input to OR gate 160, the only other input being derived from the output of the PI status register 152. The output of OR gate 160 is connected both as an input to AND gate 102 and as the D input to the PI status register 152. The status register is cleared by the LOADPI signal on line 148 from AND gate 144 (FIG. 16a), and is set by the output from AND gate 156. The latter has two inputs, an inverted LOADPI signal from line 148 and the EOO-OUT (end-of-object) signal. The status register 104 has a load-enable line that is fed from the output of AND gate 158, which has two inputs: the EOP-OUT line and an inverted from of the PIFLAGD signal on line 150.

Operation of the logic of FIG. 16b is quite straightforward and will first be explained for the case of conventional operation, i.e. not using preferred intervals. No PI-IN signal will be received and the PI registers 140 and 142 will remain at a "0" state. In FIG. 16b, the prior EOO signal will have set the PI status register 152, since AND gate 156 will be enabled by the absence of a LOADPI signal. The "1" state of the PI status register 152 will, in turn, enable AND gate 102, and byte-match signals will be gated through OR gate 158, AND gate 102 and into the status register on the occurrence of each EOP-OUT signal. This is basically the normal mode of operation that was already described with reference to FIG. 13.

In the preferred intervals mode of operation, a streamed parameter has multiple ranges that are each compared against a single memory range. These multiple ranges or preferred intervals are defined by PI control signals that accompany each member of a string of preferred intervals except the last one in the string. As with conventional operation, the previous EOO signal sets the PI status register 152. In this case, however, a PI-IN signal accompanying the streamed data sets the PI register 140 and generates a LOADPI pulse. The LOADPI signal is lowered again because the PI register 140 disables the LOADPI signal by means of AND gate 144. The LOADPI pulse thereby generated functions to clear the PI status register 152 by means of AND gate 156.

The byte match line at the time of the next EOP signal will be gated through AND gate 154 and OR gate 160 to the input of the PI status register, but will not be gated into that register until the next EOP signal during which the PIFLAGD signal has been lowered, i.e. at the end of the parameter with the preferred intervals. The status register will then reflect the parameter match status for the preferred interval parameter. As successive preferred intervals are processed, any match that is detected will set the PI status register to a "1." Only if none of the preferred intervals matches will the PI status register remain at "0." At the end of the parameter for which preferred intervals are being matched, the PI-IN signal drops to a "0" and, one clock cycle later, the PIFLAGD signal also drops. One reason for the delayed signal PIFLAGD is that the last of the preferred intervals in the streamed data does not have an accompanying PI control signal, but still has to be treated like the other preferred intervals.

If a subsequent parameter in the streamed object also has preferred intervals, a match of any one of them to the stored data parameter will result in setting the PI status register 152 to "1" and, at the end of the entire parameter, the status register 104 to "1." At the end of the preferred interval parameter, the PI signal will drop, as with the first such parameter, and the status register will indicate the overall match status up to that point in the process. After processing a parameter with preferred intervals, the logic of FIG. 16b will leave the PI status register at either a "1," if at least one of the intervals matched the memory range, or a "0" if none of the intervals matched the memory range. If processing now continues with a conventional parameter, i.e. not involving preferred intervals, a remaining "1" in the PI status register will enable AND gate 102 and processing will continue as previously described. If the PI status register contains a "0" when normal processing continues, this will be loaded into the status register, and the comparison of subsequent parameters will be irrelevant since the status register is already at "0."

For processing in the preferred intervals mode of operation, it is necessary to modify the normal sequential memory addressing scheme used to access stored data, so that the same parameter range can be retrieved more than once, for comparison with multiple value ranges being streamed through the cell. This is effected by the memory control logic shown in FIG. 8, which has already been described with reference to initialization. It will be recalled that, for normal operation of the addressing logic, the address register 64 is initially set to a value of 0 and then incremented by a count of 1 at each subsequent clock cycle. MUX 60 is used to reset the address count to zero at the end-of-cell and on a reset signal. The other MUX 59 always selects the "0" input for normal operation, and the count in the address register 64 is continually recycled and incremented.

When preferred intervals are being processed, the PI-IN signal is applied to AND gate 61, together with the EOP-IN signal. Therefore, at the end of each parameter in the PI mode of operation, the "1" input will be selected for the MUX 59. This is the input derived from the output of the count register 65, the loading of which is enabled by the absence of a PI-IN signal. So long as PI-IN is "0," the count register 65 is loaded with the output of the second MUX 60. Thus, during normal operation, not involving preferred intervals, the count register value is incremented at the same rate as the address register, and always contains a count one less than the contents of the address register. When the PI-IN signal goes to "1," indicating the arrival of the first of a string of parameters to be compared with the same stored parameter, loading of the count register 65 is disabled and the count stored in it is effectively saved for later use.

Suppose, for example, that the memory word addresses of a parameter to be used for preferred intervals processing are 003, 004 and 005. When a count of 003 is being loaded into the address register 64, a count of 002 is being loaded into the count register 65. When the streamed data value for comparing with the data from memory location 003 is clocked into the cell, the PI-IN signal accompanying this data has the effect of disabling the count register 65, which "sticks" on the value 002 for the next few operations. In subsequent cycles, the address register is incremented to 004, then 005, at which time the EOP-IN signal also appears, enabling AND gate 61 and gating the count register value back through MUXs 59 and 60 to the incrementing logic 63. Therefore, a count of 003 is again stored in the address register, and word locations 003, 004 and 005 are again accessed for comparison with the next streamed parameter. This process continues so long as the PI-IN signal is still in a "1" state. When it drops to "0," AND gate 61 is no longer enabled and MUX 59 derives its input from the address register again. Thus the address register begins to increment again, to values 006, 007 and so forth. In this manner, the logic of FIG. 8 addresses the memory 18 sequentially when no preferred intervals are involved, but addresses a single parameter repeatedly when a string of preferred intervals are streamed in for comparison with that parameter.

Bit-Level Masking

Some parameters may be defined in terms of a single bit position in a byte of data. For example, the color of a person's eyes may be defined by the bit position in a data byte. More specifically, the eye colors may be represented as follows:

blue = 1000 0000
brown = 0100 0000
green = 0010 0000
blue/green = 0001 0000
grey = 0000 1000

In this mode of data representation, using bit positions instead of numerical values, the maximum and minimum values are the same, and one is usually looking for an exact match. There is still the need to define a bit-level OR function, however, so that possible matches will not be overlooked because of the exact nature of the color definition. For example, one may wish to define the eye color parameter as blue or green or blue/green. Basically, this objective is attained by means of a bit mask that is stored, for convenience, in the streamed minimum value. The mask is logically ORed with both the streamed value and the stored value on a bit-by-bit basis. This provides values in which the masked bits are "1" in both the streamed value and the stored value. Therefore, the comparison between them is determined solely on the basis of the bits not masked. In effect then, the masked bits define a bit-level "don't care" function.

Continuing the example from above, the bit mask for the blue, green, blue/green colors is 1011 0000. If one of the three masked colors occurs in the stored parameter, and one, not necessarily the same one, occurs in the streamed parameter, then a match will be indicated. If either the streamed parameter or the stored parameter indicates a different color, there is no match unless both stored and streamed parameters indicate the same eye color. A complete "don't care" search with regard to eye color could be obtained by using a bit mask of 1111 1111.

Figure 17:
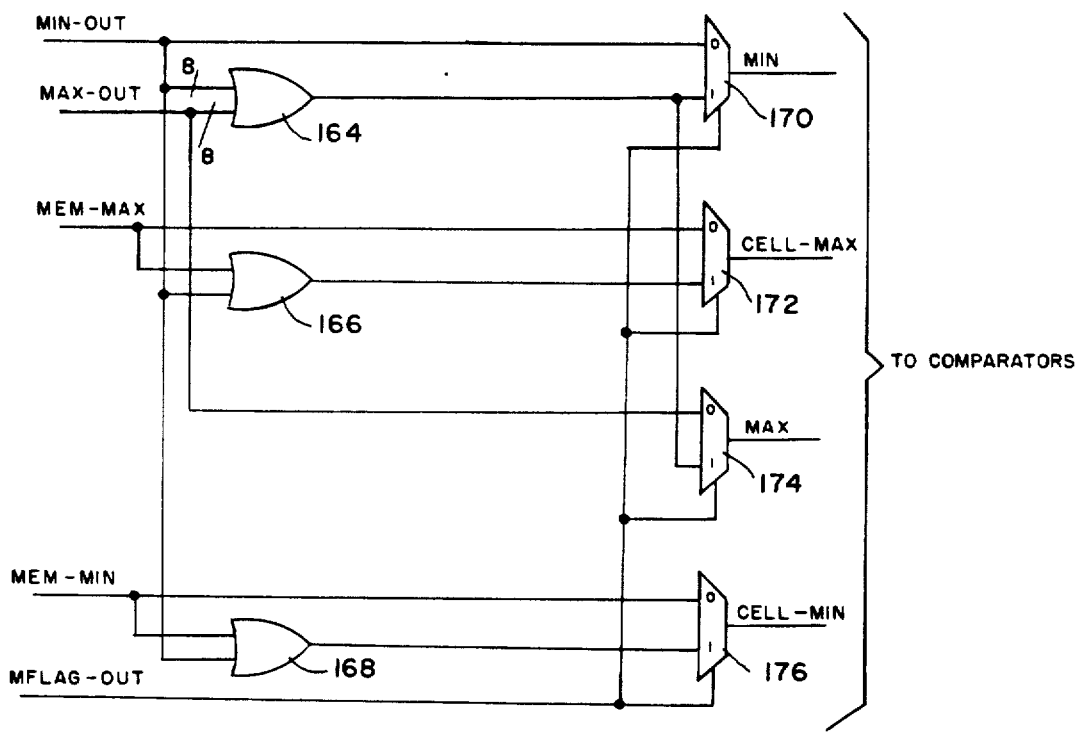
FIG. 17 is a fragmentary logic diagram illustrating the of a bit-level OR function.

Bit masking is implemented as shown in FIG. 17, using three OR gates 164, 166, and 168, and four MUXs 170, 172, 174 and 176. The MUXs are all controlled by a control signal named MFLAG-OUT, for mask flag. When the mask flag is "0," the "0" inputs of the MUXs are selected and the bit-masking logic has no effect. The MIN-OUT value from the streaming data is passed through to the MIN line applied to the comparator circuits, and the MAX-OUT line from the streaming data is passed to the MAX line for the comparator circuits. Likewise, the memory maximum line is gated directly to the CELL-MAX line for the comparators and the MEM-MIN line is gated directly to the CELL-MIN line for the comparators. In the comparators, the MIN and CELLMAX values are compared and the MAX and CELLMIN values are compared.

When bit masking is active, as indicated by a "1" value for MFLAG-OUT, the "1" inputs of the MUXs are selected and the MIN-OUT value is used to contain a bit mask. The mask is logically ORed with each of the other inputs, including MAX-OUT, MEM-MAX and MEM-MIN. The MIN and MAX signals are identically derived from ORing MIN-OUT and MAX-OUT, while CELLMAX and CELLMIN are derived from ORing MIN-OUT with MEM-MAX and MEM-MIN, respectively. The four signals are compared as before, and should yield two identical comparisons.

Conclusion

The cell structure of the invention allows comparisons to be performed between a streamed data base of objects defined by parameter ranges, and a stored set of object parameter ranges structured identically with the objects in the data base. Using multiple cells to process the same streamed data base results in exceptionally high processing speeds. For example, a system using sixty-four cells can perform approximately one billion byte comparisons per second. Current state-of-the-art computers perform typically only about two million byte comparisons per second. The system of the invention is flexible in design, in the sense that the precise comparison functions it performs are programmable by storing desired configurations of data in the cell memories. However, the principal comparison functions of the invention are implemented in hardware form for maximum speed. Most importantly, the architecture of the system is very simple in concept and implementation, and is easily extensible to provide a performance that increases linearly with the number of processing cells that are interconnected to process the same data base values.

It will be appreciated from the foregoing that the present invention represents a significant advance in the field of structured data base searching. In particular, the invention provides a technique for rapidly searching a large data base for matches between objects stored in the data base and similarly structured objects stored in the cell structure of the invention. It will also be appreciated that, although an embodiment of the invention has been described in detail for purposes of illustration, various modifications may be made without departing from the spirit and scope of the invention. Accordingly, the invention is not to be limited except as by the appended claims.

We claim:

1. A comparison circuit having at least one processing cell capable of comparing at least one object defined by multiple parameters, with a large number of objects stored in a data base external to the comparison circuit and having an identical structure but different values for the parameters, the processing cell comprising:

means for storing, during an initialization mode of operation, data values of parameters of at least one object to be compared with objects in the data base, wherein each stored parameter takes the form of a range of values specified by a maximum value and a minimum value;

means for inputting during an identification mode of operation following the initialization mode, a stream of data values of parameters of multiple objects stored in the data base, wherein each parameter is defined as a range of values specified by a maximum value and a minimum value, wherein the means for inputting the stream of data values includes an input register for temporary storage of the stream of data values;

means for comparing, during the identification mode of operation, each parameter of the stored object with the corresponding parameter of each of the multiple objects streamed into the processing cell and temporarily stored in the input register;

means for outputting, during the identification mode of operation, the stream of data values from the processing cell in the same form in which they were input; and means for outputting, during the identification mode of operation, match signals indicative of matches detected between the stored object and objects streamed through the processing cell, wherein a match is defined as a condition in which every parameter of the stored object has a range of values that overlaps the range of values of the corresponding parameter of an object streamed through the processing cell, wherein the means for comparing includes:

means for comparing the minimum value of a stored parameter with the maximum value of each corresponding parameter of the stream of data values; and means for comparing the maximum value of the stored parameter with the minimum value of each corresponding parameter of the stream of data values, wherein a match is declared unless the maximum and minimum stored values are either both greater than the maximum streamed value of both less than the minimum streamed value.

2. A comparison circuit having at least one processing cell capable of comparing at least one object defined by multiple parameters, with a large number of objects stored in a data base external to the comparison circuit and having an identical structure but different values for the parameters, the processing cell comprising:

means for storing, during an initialization mode of operation, data values of parameters of at least one object to be compared with objects in the data base, wherein each stored parameter takes the form of a range of values specified by a maximum value and a minimum value;

means for inputting, during an identification mode of operation following the initialization mode, a stream of data values of parameters of multiple objects stored in the data base, wherein each parameter is defined as a range of values specified by a maximum value and a minimum value, wherein the means for inputting the stream of data values includes an input register for temporary storage of the stream of data values;

means for comparing, during the identification mode of operation, each parameter of the stored object with the corresponding parameter of each of the multiple objects streamed into the processing cell and temporarily stored in the input register;

means for outputting, during the identification mode of operation, the stream of data values from the processing cell in the same form in which they were input; and means for outputting, during the identification mode of operation, match signals indicative of matches detected between the stored object and objects streamed through the processing cell, wherein a match is defined as a condition in which every parameter of the stored object has a range of values that overlaps the range of values of the corresponding parameter of an object streamed through the processing cell, wherein:

the means for inputting a stream of data values operates to input a fixed number of bits of data in parallel, the fixed number of data bits being smaller than the number of bits needed to define the data value of one parameter of an object;

and the means for comparing includes means for saving within the processing cell an intermediate result obtained upon comparison of a portion of the input data value with a corresponding portion of the stored data parameter value, for possible use in the generator of a match signal when subsequent portions of the input data values are processed in the processing cell.

3. A comparison circuit having at least one processing cell capable of comparing at least one object defined by multiple parameters, with a large number of objects stored in a data base external to the comparison circuit and having an identical structure but different values for the parameters, the processing cell comprising:

means for storing, during an initialization mode of operation, data values of parameters of at least one object to be compared with objects in the data base, wherein each stored parameter takes the form of a range of values specified by a maximum value and a minimum value;

means for inputting, during an identification mode of operation following the initialization mode, a stream of data values of parameters of multiple objects stored in the data base, wherein each parameter is defined as a range of values specified by a maximum value and a minimum value, wherein the means for inputting the stream of data values includes an input register for temporary storage of the stream of data values;

means for comparing, during the identification mode of operation, each parameter of the stored object with the corresponding parameter of each of the multiple objects streamed into the processing cell and temporarily stored in the input register;

means for outputting, during the identification mode of operation, the stream of data values from the processing cell in the same form in which they were input;

means for outputting, during the identification mode of operation, match signals indicative of matches detected between the stored object and objects streamed through the processing cell, wherein a match is defined as a condition in which every parameter of the stored object has a range of values that overlaps the range of values of the corresponding parameter of an object streamed through the processing cell; and means for processing multiple alternative parameter ranges for a single parameter of an object in the stream of input data values, including means for comparing each of the multiple alternative parameter ranges repeatedly with a single parameter range stored in the processing cell, wherein a match is declared when any of the multiple alternative parameter ranges overlap the stored parameter range.

4. A comparison circuit capable of comparing at least one object defined by multiple parameters, with a large number of objects having an identical structure but different values for the parameters, the comparison circuit comprising:

a plurality of processing cells connected in a series string;

means for applying a clocking signal to the processing cells to control the movement of data values and control signals from cell to cell in the series string; and means for collecting match signals generated in the processing cells;

wherein each processing cell includes input register means for receiving a stream of data values of parameters of multiple objects stored in a data base, each parameter having a maximum value and a minimum value;

memory means for storing data values of parameters of no more than one object, each stored parameter having a maximum value and a minimum value;

comparison means, for comparing each parameters of the stored object with the corresponding parameter of each of the multiple objects in the stream of data values received at the input register means of the processing cell;

means for outputting the stream of data values from the processing cell in the same form in which they were input; and means for outputting match signals indicative of matches detected between the stored object and objects streamed through the processing cell, wherein a match is defined as a condition in which every parameter of the stored object has a range of values that overlaps the range of values of the corresponding parameter of an object streamed through the processing cell, wherein the comparison means includes:

means for comparing the minimum value of a stored parameter with the maximum value of each corresponding parameter of the stream of data values; and means for comparing the maximum value of the stored parameter with the minimum value of each corresponding parameter of the stream of data values, wherein a match is declared unless the maximum and minimum stored values are either both greater than the maximum streamed value or both less that the minimum streamed value.

5. A comparison circuit capable of comparing at least one object defined by multiple parameters, with a large number of objects having an identical structure but different values for the parameters, the comparison circuit comprising:

a plurality of processing cells connected in a series string;

means for applying a clocking signal to the processing cells to control the movement of data values and control signals from cell to cell in the series string; and means for collecting match signals generated in the processing cells;

wherein each processing cell includes input register means for receiving a stream of data values of parameters of multiple objects stored in a data base, each parameter having a maximum value and a minimum value;

memory means for storing data values of parameters of no more than one object, each stored parameter having a maximum value and a minimum value;

comparison means, for comparing each parameter of the stored object with the corresponding parameter of each of the multiple objects in the stream of data values received at the input register means of the processing cell;

means for outputting the stream of data values from the processing cell in the same form in which they were input; and means for outputting match signals indicative of matches detected between the stored object and objects streamed through the processing cell, wherein a match is defined as a condition in which every parameter of the stored object has a range of values that overlaps the range of values of the corresponding parameter of an object streamed through the processing cell, wherein the input register means operates to input a fixed number of bits of data in parallel, the fixed number of data bits being smaller than the number of bits needed to define the data value of one parameter of an object; and the comparison means includes means for saving within the processing cell an intermediate result obtained upon comparison of a portion of the stored data parameter value, for possible use in the generation of a match signal when subsequent portions of the input data values are processed in the processing cell.

6. A comparison circuit capable of comparing at least one object defined by multiple parameters, with a large number of objects having an identical structure but different values for the parameters, the comparison circuit comprising:

a plurality of processing cells connected in a series string;

means for applying a clocking signal to the processing cells to control the movement of data values and control signals from cell to cell in the series string; and means for collecting match signals generated in the processing cells;

wherein each processing cell includes input register means for receiving a stream of data values of parameters of multiple objects stored in a data base, each parameter having a maximum value and a minimum value;

memory means for storing data values of parameters of no more than one object, each stored parameter having a maximum value and a minimum value;

comparison means, for comparing each parameter of the stored object with the corresponding parameter of each of the multiple objects in the stream of data values received at the input register means of the processing cell;

means for outputting the stream of data values from the processing cell in the same form in which they were input;

means for outputting match signals indicative of matches detected between the stored object and objects streamed through the processing cell, wherein a match is defined as a condition in which every parameter of the stored object has a range of values that overlaps the range of values of the corresponding parameter of an object streamed through the processing cell; and means for processing multiple alternative parameter ranges for a single parameter of an object in the stream of input data values, including means for comparing each of the multiple alternative parameter ranges repeatedly with a single parameter range stored in the processing cell, wherein a match is declared when any of the multiple alternative parameter ranges overlaps the stored parameter range.

7. A comparison circuit capable of comparing at least one object defined by multiple parameters, with a large number of objects having an identical structure but different values for the parameters, the comparison circuit comprising:

a plurality of processing cells connected in a series string;

means for applying a clocking signal to the processing cells to control the movement of data values and control signals from cell to cell in the series string; and means for collecting match signals generated in the processing cells;

wherein each processing cell includes input register means for receiving a stream of data values of parameters of multiple objects stored in a data base, each parameter having a maximum value and a minimum value;

memory means for storing data values of parameters of no more than one object, each stored parameters having a maximum value and a minimum value;

comparison means, for comparing each parameter of the stored object with the corresponding parameter of each of the multiple objects in the stream of data values received at the input register means of the processing cell;

means for outputting the stream of data values from the processing cell in the same form in which they were input;

means for outputting match signals indicative of matches detected between the stored object and objects streamed through the processing cell, wherein a match is defined as a condition in which every parameter of the stored object has a range of values that overlaps the range of values of the corresponding parameter of an object streamed through the processing cell;

wherein:

the memory means in each processing cell includes means for storing a "match-not" bit for each stored parameter data value; and the comparison means in each processing cell includes means for generating a parameter-match signal for each parameter in the cell for which the "match-not" bit is set, but only when the parameter of the stored object has a range of values that do not overlap the range of values of the corresponding parameter of an object streamed through the processing cell.

8. A method for rapidly comparing at least one object defined by multiple parameters and stored in a plurality of identical processing cells, with a large number of objects having an identical structure but different values for the parameters, the method comprising the steps of:

applying a clocking signal to the processing cells to control the movement of data values and control signals from cell to cell; and streaming data values corresponding to multiple objects from cell to cell in response to the clocking signals;

initially storing data values of parameters of at least one object in the processing cells, each stored parameter having a maximum value and a minimum value;

comparing each parameter of the stored object with the corresponding parameter of each of the multiple objects streamed into the processing cell;

generating match signals indicative of matches detected between the stored object the objects streamed through the processing cell, wherein a match is defined as a condition in which every parameter of the stored object has a range of values that overlaps the range of values of the corresponding parameter of an object streamed through the processing cell; and collecting match signals generated in the processing cells, for association with the multiple objects streamed through the processing cells.

wherein the step of comparing includes:

comparing the minimum value of a stored parameter with the maximum value of each corresponding parameter of the stream of data values; and comparing the maximum value of the stored parameter with the minimum value of each corresponding parameter of the stream of data values, wherein a match is declared unless the maximum and minimum stored values are either both greater than the maximum streamed value or both less than the minimum streamed value.

9. A method for rapidly comparing at least one object defined by multiple parameters and stored in a plurality of identical processing cells, with a large number of objects having an identical structure but different values for the parameters, the method comprising the steps of:

applying a clocking signal to the processing cells to control the movement of data values and control signals from cell to cell; and streaming data values corresponding to multiple objects from cell to cell in response to the clocking signals;

initially storing data values of parameters of at least one object in the processing cells, each stored parameter having a maximum value and a minimum value;

comparing each parameter of the stored object with the corresponding parameter of each of the multiple objects streamed into the processing cell;

generating match signals indicative of matches detected between the stored object and objects streamed through the processing cell, wherein a match is defined as a condition in which every parameter of the stored object has a range of values that overlaps the range of values of the corresponding parameter of an object streamed through the processing cell; and collecting match signals generated in the processing cells, for association with the multiple objects stream through the processing cells, wherein:

the step of streaming data values from cell to cell includes inputting a fixed number of bits of data in parallel, the fixed number of data bits being smaller than the number of bits needed to define the data value of one parameter of an object; and the step of comparing includes saving within the processing cell an intermediate result obtained upon comparison of a portion of the input data value with a corresponding portion of the stored data parameter value, for possible use in the generation of a match signal when subsequent portions of the input data values are processed in the processing cell.

10. A method for rapidly comparing at least one object defined by multiple parameters and stored in a plurality of identical processing cells, with a large number of objects having an identical structure but different values for the parameters, the method comprising the steps of:

applying a clocking signal to the processing cells to control the movement of data values and control signals from cell to cell; and streaming data values corresponding to multiple objects from cell to cell in response to the clocking signals;

initially storing data values of parameters of at least one object in the processing cells, each stored parameter having a maximum value and a minimum value;

comparing each parameter of the stored object with the corresponding parameter of each of the multiple objects streamed into the processing cell;

generating match signals indicative of matches detected between the stored object and objects streamed through the processing cell, wherein a match is defined as a condition in which every parameter of the stored object has a range of values that overlaps the range of values of the corresponding parameter of an object streamed through the processing cell;

collecting match signals generated in the processing cells, for association with the multiple objects streamed through the processing cells, and processing the multiple alternative parameter ranges for a single parameter of an object in the stream of input data values, including comparing each of the multiple alternative parameter ranges repeatedly with a single parameter range stored in the processing cell, wherein a match signal is generated when any of the multiple alternative parameter ranges overlaps the stored parameter range.

11. A method for rapidly comparing at least one object defined by multiple parameters and stored in a plurality of identical processing cells, with a large number of objects having an identical structure but different values for the parameters, the method comprising the steps of:

applying a clocking signal to the processing cells to control the movement of data values and control signals from cell to cell; and streaming data values corresponding to multiple objects from cell to cell in response to the clocking signals;

initially storing data values of parameters of at least one object in the processing cells, each stored parameter having a maximum value and a minimum value;

comparing each parameter of the stored object with the corresponding parameter of each of the multiple objects streamed into the processing cell;

generating match signals indicative of matches detected between the stored object and objects streamed through the processing cell, wherein a match is defined as a condition in which every parameter of the stored object has a range of values that overlaps the range of values of the corresponding parameter of an object streamed through the processing cell;

collecting match signals generated in the processing cells, for association with the multiple objects streamed through the processing cells, storing a "match-not" flag for each parameter stored in a processing cell; and generating a match signal for each parameter for which a "match-not" flag is set, but only when the parameter of the stored object has a range of values that do not overlap the range of values of the corresponding parameter of an object streamed through the processing cell.

* * * * *